United States Patent [19]

Brown

[11] Patent Number: 5,242,115

[45] Date of Patent: Sep. 7, 1993

[54] APPARATUS AND METHOD FOR MIXING AND DISPENSING AND MIXING NOZZLE THEREFORE

[75] Inventor: Daniel P. Brown, Palos Park, Ill.

[73] Assignee: Fomo Products, Inc., Norton, Ohio

[21] Appl. No.: 689,364

[22] Filed: Apr. 22, 1991

[51] Int. Cl.$^5$ ............................................. B05B 7/04
[52] U.S. Cl. ................................... 239/414; 239/399; 239/427; 239/432; 239/600; 366/173; 366/177; 366/338; 222/541
[58] Field of Search ............... 239/414, 432, 398, 427, 239/427.3, 114, 123, 527, 526, 399, 400, 600; 366/173, 176, 177, 182, 338; 222/541

[56] References Cited

U.S. PATENT DOCUMENTS

| | | | |
|---|---|---|---|
| Re. 29,665 | 6/1978 | Gusmer et al. | 239/414 |
| 3,096,001 | 7/1963 | Boe et al. | |
| 3,690,556 | 9/1972 | McCain | |
| 3,784,110 | 1/1974 | Brooks | 239/600 |
| 3,976,248 | 8/1976 | Middleton, Sr. | 239/414 |
| 4,023,733 | 5/1977 | Sperry | |
| 4,117,551 | 9/1978 | Books et al. | 239/414 |
| 4,133,483 | 1/1979 | Henderson | 239/527 |
| 4,262,847 | 4/1981 | Stitzer | |
| 4,377,256 | 3/1983 | Commette et al. | 239/123 |
| 4,399,930 | 8/1983 | Harding | |
| 4,427,153 | 1/1984 | Schaefer | |
| 4,453,670 | 6/1984 | Sirovy | 239/432 |
| 4,458,831 | 7/1984 | Holleran et al. | 239/527 |
| 4,550,863 | 11/1985 | Farrey | 239/414 |
| 4,603,813 | 8/1986 | Luegering | 239/399 |
| 4,643,336 | 2/1987 | Mandeville et al. | 239/432 |
| 4,708,292 | 11/1987 | Gammons | |
| 4,776,458 | 10/1988 | Summons et al. | 206/229 |
| 4,867,346 | 9/1989 | Faye et al. | 239/123 |
| 4,993,596 | 2/1991 | Brown | 239/414 |
| 5,053,202 | 10/1991 | Dwyer et al. | 366/338 |
| 5,090,814 | 2/1992 | Petcen | 366/177 |
| 5,129,581 | 7/1992 | Braun et al. | 239/414 |

Primary Examiner—Andres Kashnikow
Assistant Examiner—Christopher G. Trainor
Attorney, Agent, or Firm—Oldham, Oldham & Wilson Co.

[57] ABSTRACT

An improved multi-component mixing and dispensing apparatus having a replaceable nozzle associated therewith in which plural components are mixed before dispensing thereof. The apparatus includes improved component feed systems to maintain each component to be mixed and dispensed in a segregated condition until mixing is desired, such that the apparatus is especially suitable for the mixing and dispensing of chemically reactive components. The component feed systems include internal passages within the apparatus and is selectively actuated valve which is operable to allow flow of a component to an outlet port formed in the apparatus. A mixing and dispensing nozzle may be coupled into the apparatus so as to communicate with the outlet ports of the component feed systems, wherein improved mixing of the plural components is achieved within the nozzle assembly. The component feed systems include self-cleaning structures to ensure that the internal passages remain unblocked, and the apparatus further includes structure to selectively render the apparatus nonoperational when desired. A replaceable mixing and dispensing assembly which may be used with the dispensing apparatus is disclosed, which allows more thorough metering and mixing of plural components within a kinetic mixing chamber, and may include a second stage of mixing if desired. The nozzle assembly may also be configured to have a plurality of nozzle tip configurations integrally formed therein wherein each of the nozzle tips may be selectively exposed for use.

30 Claims, 5 Drawing Sheets

APPARATUS AND METHOD FOR MIXING AND DISPENSING AND MIXING NOZZLE THEREFORE

BACKGROUND OF THE INVENTION

This invention generally relates to a plural component dispensing apparatus adapted to mix and dispense multiple components therefrom, and a mixing nozzle assembly for use with dispensing apparatus of this type. More specifically, the invention relates to a dispensing device for forming and dispensing a product by mixing a plurality of chemically reactive components, the device including a replaceable mixing nozzle which completely isolates and separates the reactants from the dispenser body and allows the components to be more effectively mixed to provide better results and avoid problems associated with such apparatus.

In a variety of applications, it is desirable to mix a plurality of chemically reactive materials with one another, which may then be dispensed from a suitable dispensing apparatus. As an example, in polyurethane foam systems, a plurality of components are mixed together to form a polyester, polyurea, or polyether resin foam product. In polyurethane foam systems, the plural components to be mixed may comprise an isocyanate and polyol or other catalyst, each of which is generally stable and will stay in a liquid state for an extended period of time. Upon mixing of these components in the proper amount and in a thorough manner, a chemical reaction will cause polymerization of the components. In such resin blends, a blowing agent may be used to cause the reactive polyurethane to foam, cure and cross-link to form a solid material. Such materials are utilized as industrial foams for packaging, insulation, in the shaping and coating of articles or other uses. The requirement for mixing the components and thereafter dispensing the formed product has led to the design of a variety of dispensing apparatus adapted to mix plural components. In the design of dispensing apparatus utilized to mix plural components in this manner, the hardening of the mixed components within the dispensing apparatus may clog or block the dispensing passages and ports of the apparatus such that the dispensing device will be rendered inoperative. Conventionally, the dispensing apparatus may be cleaned by the use of solvents introduced into the device to wash out the individual components as well as the hardened resin material formed upon mixing. The use of such solvents is undesirable as the evaporation of the solvents may result in condensation of moisture which will interfere with the chemical reaction and may affect the quality of the formed product such as a polyurethane foam. Other drawbacks of such devices include the inability to properly meter the separate components and inadequate mixing of the components within the apparatus.

Regarding the discussion of solvents and the problems associated with solvent cleaning dispensers:
Solvents present an environmental disposal problem
Solvents present a worker safety problem
There is no universal solvent suitable for cured urethane
Solvents add cost to the production Another technology used that has evolved to replace solvent flush technology is Reaction Injection Molding (RIM) in this method the materials are separately entered into a mixing chamber that is mechanically cleaned by a plunger which mechanically moves through the bore after the reaction to displace the reactants and clean the walls of the mixing chamber. This technology is widely practiced in the mass production of urethane plastic parts such as the automotive or shoe sole industries. The use of this technology is not desirable in the market intended for the new dispenser because:

RIM Technology requires very high mixing pressures not attainable in portable foam kit systems.
RIM Technology requires elaborate machined high pressure mixing heads that operate off hydraulic pressure in order to function reliably.
RIM Technology requires extensive maintenance.
RIM Technology is very expensive.

A variety of prior art devices have been developed for mixing and dispensing of chemically reactive components In U.S Pat. No. 4,427,153, a plural component dispensing gun is disclosed which includes a spray gun nozzle having a one piece mixing chamber with axially displaced inlets stated to provide better mixing and having a sealing arrangement to prevent leakage of the separate components from the spray nozzle. In U.S. Pat. No. 4,023,733, a foam dispensing gun is disclosed as having a mixing chamber with liquid entry ports, wherein one liquid entry port is spaced upstream from the other to prevent undesirable cross-feeding between the inlet ports. This construction is also stated to provide better mixing of the plural components. In U.S. Pat. No. 4,708,292, a dispensing apparatus is shown as having a mixing chamber within the nozzle thereof into which the plural materials are introduced by separate inlet ports. The liquid components enter the mixing nozzle at an angle such that the separate streams of liquid are directed toward one another for better mixing. Although the above apparatus as well as other prior art dispensing devices have attempted to overcome the deficiencies in properly mixing the reacting components to optimize the production of polyurethane foam or the like, such apparatus is still deficient in some respects such as in providing proper metering of the individual liquid components and ensuring proper mixing continuously to optimize the polymerization process without fouling the dispenser in the process.

A variety of dispensing devices have also been designed to remedy the possible hardening or setting up of the reactive components within the device which creates significant problems. In U.S. Pat. No. 4,399,930, a foam dispensing gun includes a disposable nozzle for mixing and dispensing separate fluid components. The foam dispensing gun is designed to be inoperative in the absence of a dispensing nozzle on the gun and allows the nozzle to be removed for reloading. In U.S. Pat. No. 4,262,847, a urethane foam gun is disclosed which includes dual plug valves for control of separate streams of the plural components and a second gun-mounted valve which controls a solvent flush for cleaning. It is again found that such designs have drawbacks in properly maintaining the dispensing device in an operative condition and avoiding the blockage of internal passageways and nozzle of the apparatus.

SUMMARY OF THE INVENTION

Based upon the foregoing, there has been found a need for a multi-component dispensing device which allows more efficient metering of the components to be mixed, more effective mixing of the plural components and improved dispensing characteristics to avoid problems associated with such prior art devices. It is therefore a main object of the invention to provide a multi-component dispensing apparatus which includes an improved mixing head and a mixing and dispensing nozzle for use with such apparatus to allow more effective and uniform mixing of the plural components to be dispensed therefrom.

Another object of the invention is to provide a multi-component dispensing apparatus which more effectively meters the separate components while providing a self-cleaning design which maintains the apparatus in better operating condition.

It is another object of the invention to provide a multi-component dispensing apparatus which properly meters plural components to be mixed within a novel replaceable mixing nozzle which may include a plurality of mixing chambers resulting in more effective mixing of the materials exterior to the dispensing gun structure of the device.

Yet another object of the invention is to provide a multi-component dispensing apparatus which includes sealing means to prevent the components to be mixed from entering the mixing chamber unless selectively actuated by the user, and providing a self-cleaning configuration to prevent blockage of internal passageways within the apparatus as well as to prevent moisture from the environment reacting with the isocyanate.

It is another object of the invention to provide a multi-component dispensing apparatus which is inoperable when a removable dispensing and mixing nozzle is not properly positioned within the apparatus.

Still another object of the invention is to provide a novel mixing and dispensing nozzle which is removable and may be disposable, and which is designed to control the introduction of each component into the mixing chamber thereof and to more thoroughly and effectively mix the components therein while enabling the mixed materials to be dispensed in a desired configuration.

The invention comprises a multi-component dispensing apparatus in which at least two materials are adapted to be mixed with one another in at least one mixing chamber formed in a replaceable nozzle associated therewith. The apparatus includes a mixing head having valving means and a plurality of internal passages utilized to meter the desired amount of plural components to outlet ports formed in the mixing head. The valving means may comprise a plurality of needle valves which are selectively actuated by means of a trigger member pivotally mounted to the mixing head. The needle valves may be actuated simultaneously, and may be used to meter the proper amount of a particular component in the system. The valving means is also positioned relative to the internal passageways of the mixing head such that a self-cleaning action is created upon actuation of the valves. The replaceable nozzle assembly is adapted to be positioned within an opening formed in the mixing head to communicate with the plurality of passages formed therein, and includes a mixing chamber having inlet ports through which the materials are fed. A plurality of inlet ports may be provided for each of the materials to be mixed within the mixing chamber to allow better metering of each material into the chamber and better mixing of the constituents therein. The plurality of inlet ports are displaced axially along the length of the mixing chamber and are offset from opposed inlet ports, such that flow from any particular inlet port will not affect flow from another inlet port, and impingement mixing within the mixing chamber is accomplished from each of the inlet ports. The mixing chamber of the dispensing nozzle may also have associated therewith a sealing structure between the outlet ports of the mixing head and the inlet ports of the mixing chamber. The nozzle assembly may also include a second stage mixing system positioned downstream of the mixing chamber to ensure proper mixing before the material is dispensed through the nozzle tip. The nozzle tip itself may comprise a plurality of configurations within an integral tip member such that the user may select a particular nozzle tip configuration to be used for a particular application.

The multi-component dispensing device also allows the mixing head thereof to be selectively placed in a non-operational configuration, which will prevent use of the device unless a suitable dispensing nozzle is in place with the system. The trigger member associated with the mixing head of the apparatus may include a hammer portion moveable in conjunction with the trigger member. The hammer portion may act upon a plug moveable in the mixing head to position the plug member such that the apparatus is non-operational. In the non-operational position, the plug member completely seals the outlet ports in the mixing head, and the plug member also acts to eject the dispensing nozzle from the aperture. In this way, the internal passages of the mixing head cannot be contaminated with another of the components to be mixed in the system such that the passageways will remain free from blockage.

The multi-component dispensing apparatus of the invention alleviates many of the disadvantages found in prior art dispensing devices, and yet provides a cost effective and simply used system which is efficient and rugged in its operation.

BRIEF DESCRIPTION OF THE DRAWINGS

These and other objects and advantages of the invention will become apparent upon a reading of the following detailed description of the invention, taken in conjunction with the accompanying drawings, wherein.

DETAILED DESCRIPTION OF THE INVENTION

Figure 1:
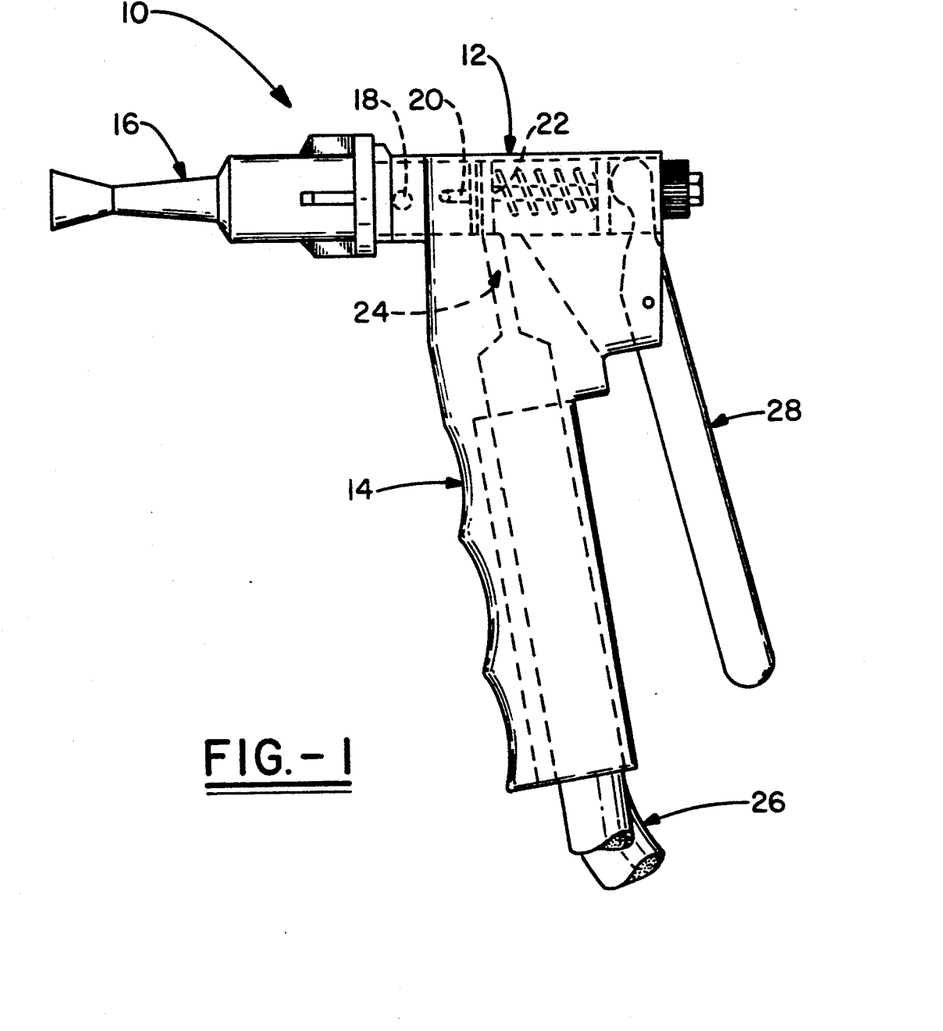
FIG. 1 is a side elevational view of the dispensing apparatus of the invention in its assembled configuration ready for use.

Turning now to FIG. 1, a multi-component dispensing apparatus 10 is shown which is particularly suitable for mixing and dispensing two liquids, such as liquid organic resins and liquid isocyanates, which react to form a polyurethane foam when mixed. The apparatus 10 is generally formed as a gun to facilitate dispensing operations, and comprises a mixing head 12 and handle section 14. The apparatus 10 is preferably formed by molding techniques using structural plastic materials such as Styrene-K-resins, Celcon, Delrin or polyester, but may be constructed by other suitable techniques or materials. Fitted within and extending from the mixing head 12 is a mixing and dispensing nozzle 16 which includes at least one mixing chamber 18. The nozzle 16 and mixing chamber 18 may also be formed by molding techniques, such that the entire assembly is easily and cost-effectively manufactured. The mixing chamber 18 communicates with individual component feed systems having internal passages 20 and a valve means 22 for each component to be mixed in the system. The internal passages 20 also communicate with a plurality of inlet ports 24 which may be coupled to a source of a liquid component under pressure such as by hoses 26 or alternatively by portable pressurized aerosol cylinders or the like. The valve means 22 is actuated by means of a trigger member 28 to allow flow of the liquid components within the internal passages 20 and to mixing chamber 18 to be dispensed through dispensing nozzle 16.

Although the multi-component dispensing system of the invention is particularly useful for polyurethane foam systems, wherein a plurality of reactive components are mixed and dispensed in a foaming process, the apparatus may also be useful in other applications such as with various thermosetting plastics, spray catalyst glues, gel coats or the like. In most instances, the components to be mixed will be chemically reactive with one another, but the device may also be used with non-reactive liquids which are to be mixed and dispensed. Similarly, although the invention will be described with respect to a two component system, it will be appreciated that other component feed systems may be provided for a third or more components as desired.

Figure 2:
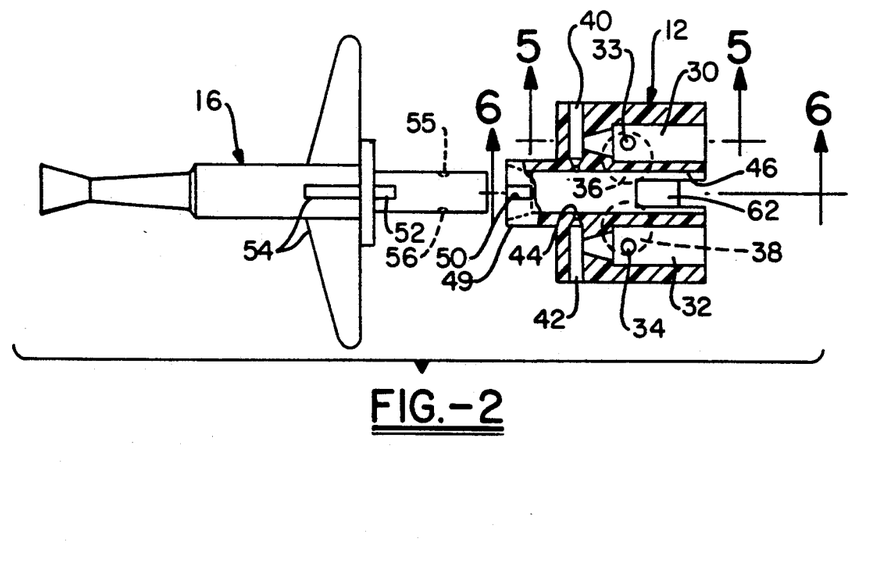
FIG. 2 is a exploded top plan view in partial section of the mixing head and mixing and dispensing nozzle of the apparatus as seen in FIG. 1.
Figure 3:
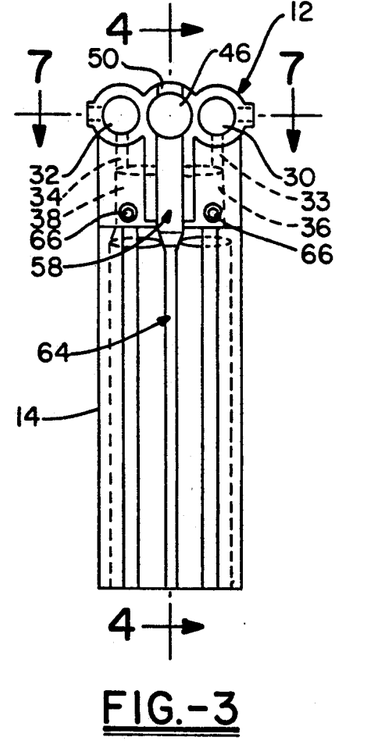
FIG. 3 is a rear elevational view of the mixing head as seen in FIG. 2.

Referring now to FIGS. 2 and 3, the mixing head and dispensing nozzle assembly of the invention is shown in more detail. The mixing head 12 includes first and second valve cavities 30 and 32 respectively, in each of which is provided a valve means to be described in more detail hereinafter. The valve cavities 30 and 32 each include an inlet or supply orifice 33 and 34 respectively which cooperate with component feed cavities 36 and 38, coupled to a source of a component to be mixed under pressure. The valve cavities 30 and 32 also communicate via metering ports with separate internal passages 40 and 42 which include first and second outlet orifices 43 and 44 respectively. The outlet ports 43 and 44 communicate with a nozzle opening 46 formed in a center region of mixing head 12 and extending therethrough. Associated with the nozzle opening 46 is a collar 49 which extends outwardly from mixing head 12 to accept a portion of the dispensing nozzle 16. More particularly, the nozzle opening 46 is designed to accommodate the shank portion 48 of dispensing nozzle 16 in tight frictional engagement therein for use of the apparatus. The collar 49 may include a narrow, elongated slit 50 adapted to receive a key pin 52 formed adjacent the shank portion 48 of dispensing nozzle 16. Proper alignment of the dispensing nozzle 16 within the nozzle opening 46 for use is easily achieved by positioning key pin 52 within and seated against the back edge of slot 50. As the shank portion 48 of dispensing nozzle 16 is to be frictionally inserted within nozzle opening 46, the dispensing nozzle 16 may be provided with a plurality of flanges 54 which allow manipulation of the dispensing nozzle 16 for proper alignment of the key pin 52 within guide slot 50. When the shank portion 48 of dispensing nozzle 16 is positioned within nozzle opening 46, the outlet orifices 43 and 44 in mixing head 12 will be coupled to injection ports 55 and 56 formed on shank portion 48 of the dispensing nozzle 16.

As seen with reference to FIGS. 2 and 3, the nozzle opening 46 also communicates with an elongated trigger cavity 58 which extends downwardly from the nozzle opening 46 and is adapted to house a trigger mechanism as will be hereinafter described. A slot 60 is provided along the upper portion of the nozzle opening 46 in association with the trigger cavity 58. The cavity 58 includes a sloping surface 62 such that the trigger cavity communicates with the nozzle opening 46 over the portion of nozzle opening 46 extending from a position adjacent the outlet orifices 43 and 44 communicating therewith. In FIG. 3, the handle portion 14 is seen to include a cavity 64 to house the flexible pressurized feed lines for each component to be mixed. The feed lines may be inserted into the component feed cavities 36 and 38 using a quick coupling fitting as an example, wherein the feed assemblies will be sealed within cavities 36 and 38 by suitable sealing means and may be locked in place by means of screws 66 or a similar locking mechanism. Liquid components to be mixed are directed through passages 33 and 34 from feed cavities 36 and 38 which communicate with the valve cavities 30 and 32. The valve cavities 30 and 32 will in turn communicate with internal passages 40 and 42 through metering orifices to be directed to the outlet ports 43 and 44 for injection into the dispensing nozzle 16.

Figure 4:
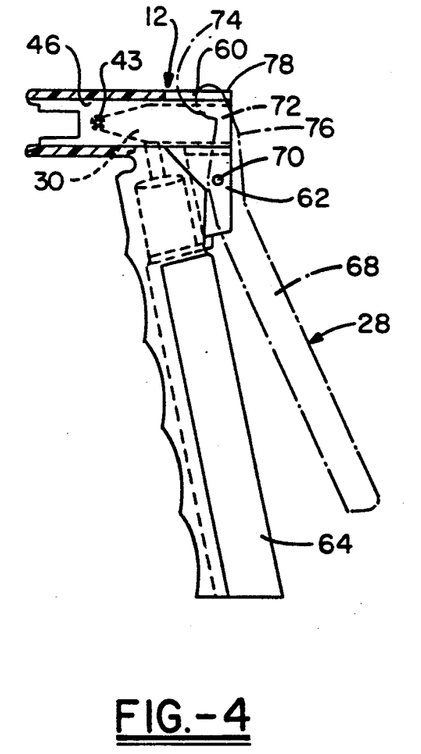
FIG. 4 is a view along line 4—4 of FIG. 3 with the trigger member of the apparatus coupled thereto.

Turning now to FIG. 4, the trigger assembly 28 is shown in its attached position relative to mixing head 12. The trigger mechanism 28 may include an elongated trigger arm 68 extending in a position adjacent handle portion 14 of the mixing head 12 such that the trigger 28 may be easily held and operated in association with handle 14. The trigger assembly 28 may be mounted to mixing head 12 by means of a pivot pin 70 so as to be pivotable within the trigger cavity 58. The trigger assembly 28 includes an upper hammer portion 72 which is adapted to act upon a valve actuating structure to be described hereinafter, as well as to perform the dual function of enabling the dispensing apparatus to be rendered inoperative or non-operational when desired and to eject the dispensing nozzle 16 from mixing head 12. The trigger cavity 58 in which the trigger member 28 is housed again includes the downwardly sloping bottom surface 62, and the trigger member 28 is pivotable about point 70 such that the trigger member 28 will be pivotable in both forward and backward directions in the assembly. From the at rest position demonstrated in FIG. 3, the trigger arm 68 may be depressed toward handle portion 14 to allow the components under pressure to flow through the internal passages to the dispensing nozzle 16 of the apparatus. The trigger arm 68 may also be pulled outwardly from the handle portion 14 wherein the hammer 72 will travel within nozzle opening 46 to the extent of sloping surface 62 of trigger cavity 58. The trigger member 28 includes a bearing surface 74 facing inwardly and a bearing surface 76 directed outwardly from trigger cavity 58. Also as seen in FIG. 4, the upper portion of the hammer 72 may extend above the top wall 78 of mixing head 12 to enable the desired travel to be obtained within nozzle opening 46 by hammer 72. To accommodate the extent of hammer 72, the channel 60 is provided along the upper portion of nozzle opening 46. It should be apparent that the trigger mechanism 28 has been found to be a simple and cost effective means for providing the desired functions, but other constructions may be suitable and are encompassed within the invention.

Figure 5:
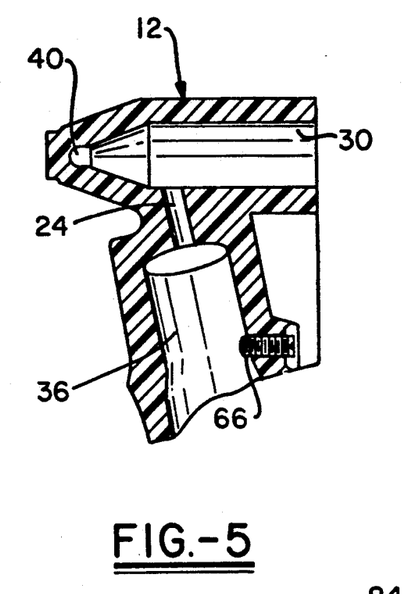
FIG. 5 is an enlarged partial cross-section taken along the line 5—5 of FIG. 2 showing the internal passages in the mixing head associated with one of the components to be mixed with the apparatus.
Figure 6:
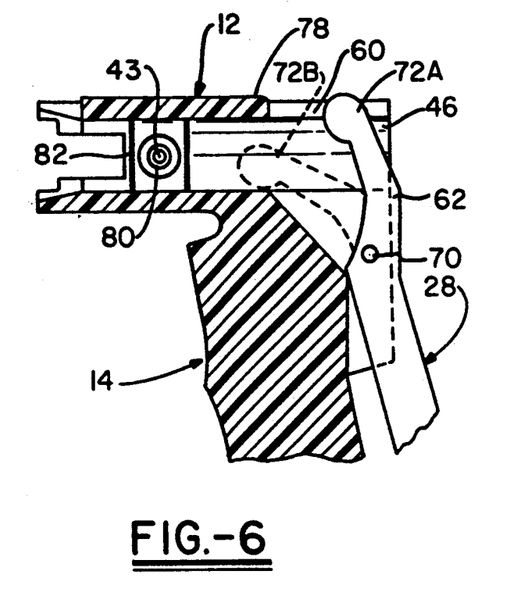
FIG. 6 is an enlarged partial cross-section taken along line 6—6 of FIG. 2, showing the opening within the mixing head and sealing means associated therewith.

Turning now to FIG. 4, 5 and 6, various of the aspects of the mixing head 12 will be described in more detail. In FIG. 5, the internal passages within the mixing head 12 are shown for one of the liquid component feed systems within mixing head 12. The valve cavity 30 is designed to house a valve means therein, which is adapted to selectively open and close supply port 33. The inlet port 33 is coupled to the component feed cavity 36 from which a supply of a liquid component will be directed under pressure. Upon suitable positioning of a valve means within valve cavity 30, flow of a liquid component from supply port 33 will proceed to internal passage 40 and then on to outlet port 43. The back edge of the valve cavity 30 is open to accept a suitable valve means therein and to allow valve actuating means to extend from cavity 30 for operation of the valve means. As seen in FIG. 6, in the preferred embodiment, the nozzle opening formed in the mixing head 12 may be generally cylindrical and lies adjacent the valve cavities of the mixing head 12 with its axis substantially parallel to the axis of the valve cavities 30 and 32. The top wall 78 of the mixing head 12 encloses nozzle opening 46 over a portion of its length, but is cut away at channel 60, which as stated previously allows hammer portion 72 of trigger assembly 28 to pass therethrough. The trigger assembly is movable from the operational, valve-actuating position as seen in ghost at 72a, to a non-operational nozzle ejecting position indicated in ghost at 72b within nozzle opening 46. The outlet port 43 of the liquid component feed system is also seen to enter nozzle opening 46 at a side portion thereof within the enclosed space of opening 46. Situated about the outlet port 43 may be provided an integrally formed sealing land 80 formed circularly about outlet port 43. The sealing land 80 may be adapted to frictionally engage the shank portion of the dispensing nozzle to be used with mixing head 12 and about an inlet port provided on the dispensing nozzle. The sealing land 80 will prevent leakage of a liquid component beyond the area immediately adjacent outlet port 43. There may also be provided additional sealing members 82 positioned on either side of outlet port 43 which may be integrally formed in the nozzle opening 46 to simulate O ring seals about the outlet ports 43 and 44 respectively. The sealing means 82 may provide additional protection against leakage of the liquid components from the dispensing apparatus as desired.

Figure 7:
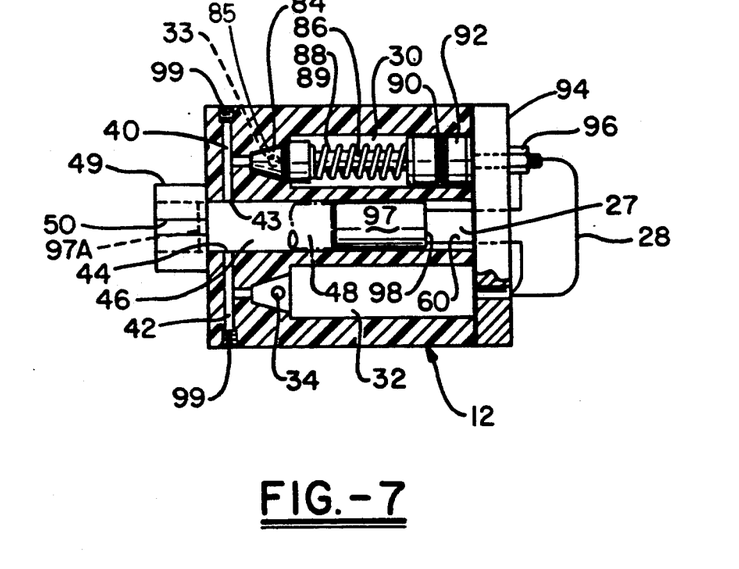
FIG. 7 is an enlarged cross-sectional view taken along 7—7 of FIG. 3 in partial section.

Turning to FIG. 7, the mixing head is shown in its fully assembled condition for use. As seen in this figure, mixing head 12 of the preferred embodiment will be comprised of two liquid component feed systems adapted to feed individual liquid components in a separated fashion to the location of a mixing and dispensing nozzle used in the apparatus. Again, additional liquid feed systems may be provided and the configuration modified accordingly as desired. Within each valve cavity 30 and 32, there will be provided a valve means 84, which in the preferred embodiment is a needle valve extending into the front portion of valve cavity 30 so as to seal the inlet ports 36 and 38 respectively. The valve means may be sealed about its periphery adjacent to inlet ports 36 and 38 by means of an O-ring seal 89 or the like, which ensures that none of the liquid components can enter the valve cavities 30 and 32 to avoid blockage and malfunction of the liquid feed systems. The valve means may also include a valve stem 86 extending towards the back of mixing head 12 within valve cavity 30. The valve stem 86 may be surrounded by a bias spring 88 extending between the packing head of the needle valve 84 and rear packing member 90, which together completely seal the valve cavity 30. A locking bonnet 92 may be used to maintain the valve configuration within the valve cavity 30 with the valve stem 86 being sealed at rear packing 90 and extending outwardly from valve cavity 30. A valve actuating member 94 is secured to the rear of the mixing head 12 and to the valve stems 86 extending from valve cavities 30 and 32 respectively by suitable securing means such as a locking nut 96. The valve actuating member 94 is therefore secured to both valve stems 86, and has a mid portion thereof positioned adjacent trigger cavity 58. The bearing surface 76 on hammer portion 72 of trigger assembly 28 is adapted to act on valve actuation member 94. In this way, upon depression of the trigger assembly 28, the valve actuating member 94 will be urged outwardly against the force of bias spring 88 to open needle valve 84 and allow flow through inlet ports 36 and 38 to internal passages 40 and 42 respectively. In the valve cavities 30 and 32, the needle valve 84 includes a sealing member or head portion 85 which will be biased by the spring member 88 to close the supply ports 33 and 34. The head portion 85 of needle valves 84 is shaped to correspond to the shape of the valve cavities 30 and 32 to seal the supply ports 33 and 34. In the construction of the valve assemblies within each valve cavity 30 and 32, the needle valve 84 is adapted to move in a substantially perpendicular manner relative to supply ports 33 and 34. Additionally, upon actuation of the needle valve 84, the head portion 85 of the valve members will perform a scraping action at the location of the supply ports 33 and 34 such that these ports will remain free from blockage and to ensure free flow of the liquid components therethrough. The shape of the head portion 85 of valve means 84 may provide the scraping action as desired. Such scraping accomplishes self-cleaning of the internal passages in a continuous manner to ensure proper operation of the apparatus without having to use solvents or the like. The internal passages 40 and 42 may be drilled into the mixing head 12 and thereafter sealed by screw plugs 99, a suitable cement or the like. Each of the valve systems in the dispensing device will therefore be actuated simultaneously for proper metering of the liquid components therethrough. It should also be recognized that if one or the other of the liquid components is to be dispensed alone or in different proportions, the valve actuating member 94 may be modified to allow selective actuation of either of the valve assemblies alone or partially.

Also provided in the mixing head 12 is a means to selectively render the dispensing device non-operational and to provide effective sealing of the liquid component feed systems to maintain such systems in proper working order. Specifically, in the preferred embodiment, a sealing plug 97 is disposed within nozzle opening 46, which as seen in FIG. 7 is positioned with the dispensing device in its operational mode. The hammer portion 72 of trigger assembly 28 lies directly adjacent the rear surface 98 of sealing plug 97 as seen in FIG. 7, and at its other end will lie adjacent the shank 48 of a dispensing nozzle assembly positioned within nozzle opening 46 as seen in ghost partial outline. As mentioned with respect to FIG. 6, when the hammer portion 72 of trigger assembly 28 is moved forwardly through channel 60 and into nozzle opening 46, the bearing surface 74 will act upon rear surface 98 of the sealing plug 97 so as to move sealing plug 97 within nozzle opening 46 toward the outlet ports 43 and 44 formed therein. Upon continued movement of hammer 72 within nozzle opening 46, the sealing plug 97 will be repositioned within nozzle opening 46 as shown by ghost outline indicated at 97a. In this position, the sealing plug 97 will completely seal the outlet ports 43 and 44 in an airtight fashion to prevent leakage of liquid components therefrom and to prevent the ingress of the outside atmosphere which could tend to cause solidification or contamination of the individual liquid components at the location of outlet ports 43 or 44 or within the internal passages 40 and 42 as an example. Such solidification would result in blockage of the internal passages in the liquid component feed systems rendering the dispensing apparatus unusable. It should also be apparent that upon movement of the sealing plug 97 within nozzle opening 46, the sealing plug 97 will act upon shank portion 48 of a dispensing nozzle positioned within nozzle opening 46. The sealing plug 97 will therefore perform the dual function of issuing the shank portion 48 of a dispensing nozzle outwardly from opening 46 to be ejected from the apparatus. It should be apparent that this aspect of the apparatus allows a variety of dispensing nozzles to be easily used in the apparatus, and replaced to achieve desired operational characteristics. A disposable mixing and dispensing nozzle could be utilized, wherein after use, the sealing plug is moved to eject the disposable nozzle and seal the outlet ports of the liquid component feed systems until use of the apparatus is again desired. In this way, no solidification of the liquid components to be mixed and dispensed can occur and the apparatus is indefinitely placed in a non-operational mode. For further use, a replaceable dispensing nozzle assembly may simply be pushed into the nozzle opening 46 against sealing plug 97 until operatively coupled to outlet ports 43 and 44 formed in nozzle opening 46, and to the position as shown in solid line of FIG. 7.

Figure 8:
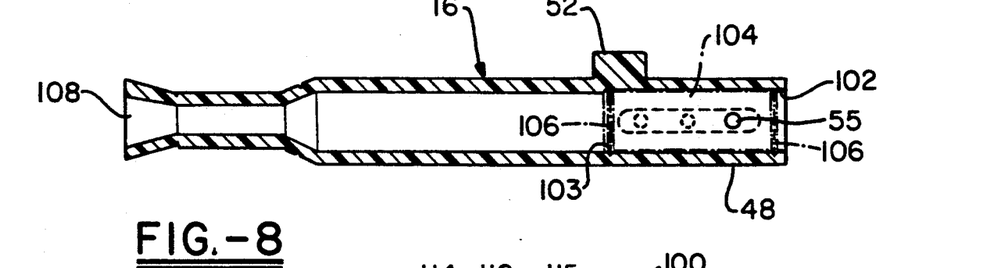
FIG. 8 is a cross-sectional view of an embodiment of the mixing and dispensing nozzle of the invention.

Turning now to FIG. 8, the mixing and dispensing nozzle assembly 16 of the invention is shown in more detail. Although any suitable dispensing nozzle may be used in the dispensing apparatus of the invention, an improved nozzle assembly in accordance with the invention is preferably used in conjunction therewith. The nozzle assembly 16 comprises an elongated tubular member, which in the preferred embodiment has an outwardly extending alignment key pin 52, adapted to be positioned within a slot formed in the nozzle opening of the dispensing apparatus. In this way, the alignment of nozzle 16 within nozzle opening 46 is ensured to enable the outlet ports 43 and 44 of the liquid component feed systems to coact with nozzle assembly 16 in a desired manner. As previously mentioned, the shank portion 48 of the nozzle assembly is to be inserted within the nozzle opening 46 of mixing head 12 of the dispensing apparatus, such that injection ports 55 and 56 formed on opposed sides of the shank portion 48 will be positioned in alignment with outlet ports 43 and 44 respectively of the dispensing apparatus. The injection ports 55 and 56 are in turn connected to an insertable mixing chamber 100 positioned within shank portion 48. The insertable mixing chamber 100 will thereby seal the open end 102 of the nozzle assembly adjacent the shank portion 48 of the assembly. As seen in FIG. 8, the interior of the tubular nozzle adjacent end 102 may be provided with recessed areas 103 and 104 which are adapted to engage shoulder portions 106 formed on mixing chamber insert 100, such that the mixing chamber insert will be snap fit in the proper position within shank portion 48.

Figure 9:
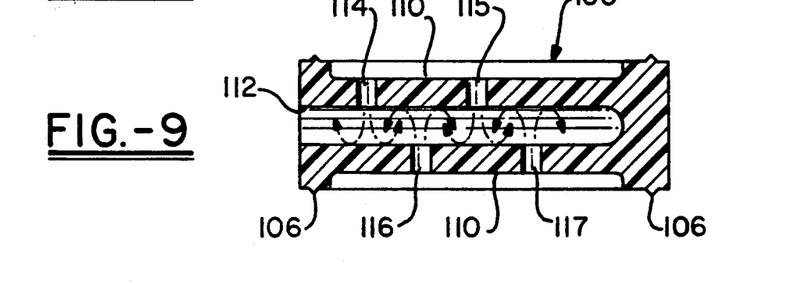
FIG. 9 is an enlarged cross-sectional view of an embodiment of the kinetic mixing chamber associated with the dispensing nozzle of the invention.
Figure 10:
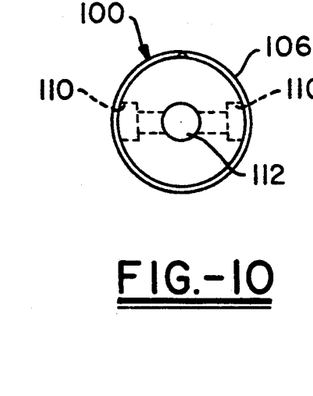
FIG. 10 is an end view of the mixing chamber as seen in FIG. 9.
Figure 11:
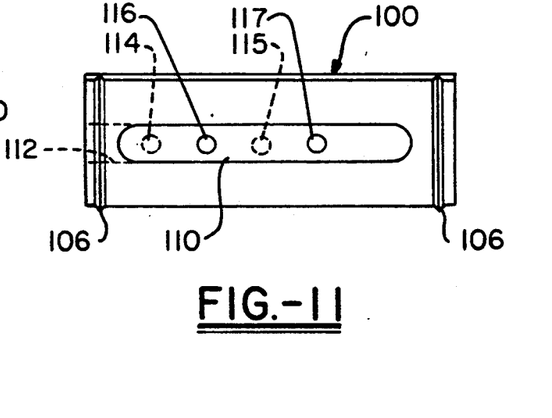
FIG. 11 is a side view of an alternate embodiment of the kinetic mixing chamber as seen in FIG. 9.

Turning to FIGS. 9-11, a first embodiment of the mixing chamber insert 100 to be used in conjunction with the dispensing nozzle 16 of the invention is shown. In many instances, the particular components which are to be mixed and dispensed using the apparatus of the invention may have distinct characteristics which require that the mixing chamber be modified according to these characteristics. By providing the mixing chamber 100 as a replaceable insert which is easily positionable within a dispensing nozzle, the particular component characteristics may be accommodated in the dispensing system both quickly and easily. The mixing chamber insert 100 comprises an elongated body member, which may be substantially cylindrical in shape and be dimensioned so as to tightly fit within the tubular interior of shank portion 48 of the nozzle assembly 16 through its rear open end 102. The body portion of the mixing chamber insert 102 may include integrally formed outwardly extending sealing shoulder portions 106. The shoulder portions 106 essentially comprise integrally formed O ring seals to prevent the leakage of liquid components therefrom. As seen in FIG. 9, in a two component system, the mixing chamber 100 is formed to have two opposed slots or channels 110 along each side thereof which coact with the injection ports 55 and 56 formed in the nozzle 16. The channels 110 are adapted to extend longitudinally along a substantial portion of the length of the mixing chamber insert 100 such that material entering the channel will be disbursed over a larger area. In this embodiment, the actual mixing chamber is formed as a central opening 112 having an open end which faces the interior of the dispensing nozzle 16 in which the insert 100 is to be positioned, and having its other end closed as seen in FIG. 9. The central opening 112 constitutes the chamber in which plural components are to be mixed utilizing the technique of impingement mixing of the individual components within chamber 112. The mixing chamber 112 communicates with each of the channels 110 formed in insert 100 by means of a plurality of injection ports 114, 115, 116 and 117 connected to each channel 110 respectively. Also as seen in FIG. 9, each of the injection ports 114, 115, 116 and 117 are axially offset with respect to one another, and in relation to each channel 110 are positioned linearly so as to communicate with each of the respective channels 110.

It has been found that the use of a plurality of injection ports to introduce each liquid component to be mixed into the mixing chamber 112 enables better mixing of the materials to occur and improves metering of the individual liquid components into the mixing chamber to thereby optimize the efficiency of a polymerization process or other chemical reaction which may occur upon mixing. It should be understood that in a polyurethane foam system, a given amount of isocyanate will be preferably mixed with a given amount of a catalyst to produce the polyurethane foam without waste of the individual components. Proper metering of the individual components is therefore critical to proper polymerization, and is facilitated by the provision of a plurality of injection ports 114, 115, 116 and 117 associated with each of the injection channels 110. Also, as seen in FIG. 9, by providing each of the individual injection ports 114 and 115 for an individual liquid component in axially offset relationship to the opposing injection ports 116 and 117 for another liquid component, each of the liquid components is directed under pressure into mixing chamber 112 and against an opposing wall of chamber 112 as indicated by flow lines in chamber 112. The impingement mixing obtained by directing individual streams of a liquid component against an opposing wall of the chamber to create turbulence allows better and more thorough mixing of the components with one another and avoids cross flow problems within chamber 112. Once the plural components have been introduced and thoroughly mixed within mixing chamber 112, the continued introduction of additional components into mixing chamber 112 will force the mixed materials into the interior 118 of the dispensing nozzle 16. In a polyurethane foam system, the mixed plural components will begin polymerization within mixing chamber 112 and will continue to polymerize within interior portion 118 of the dispensing nozzle 16. A fully polymerized foam product will be produced and will be forced from nozzle 108 to be dispensed at the desired location.

In operation, each of the plural components to be mixed and dispensed using the apparatus of the invention will be supplied under pressure from a component supply tank (not shown) or the like. Such supply tanks are conventionally of sizes ranging from 5 to 30 liters depending upon the particular application and requirements thereof. Each individual liquid component is fed at a line pressure of about 50 to 250 psi, and with polyurethane foam systems as an example will be fed to the dispensing apparatus at a pressure of between 100 to 200 psi. The dispensing apparatus of the invention is also usable with aerosol containers being charged at a pressure of 80 to 90 psi or greater. As previously described, the pressure lines from the component supply tanks or aerosol containers may be attached to the dispensing apparatus in component feed cavities 36 and 38 such as by use of a quick coupling fitting or the like. A removable dispensing nozzle 16 is positioned within nozzle opening 46 within mixing head 12 of the apparatus, and is forced into opening 46 until key pin 52 is positioned within key slot 50 as seen in FIG. 2. In this position, the injection ports 55 and 56 formed on the shank portion 48 of nozzle 16 will be aligned with outlet ports 43 and 44 associated with each component feed system in mixing head 12. The dispensing apparatus is operational in this configuration, and the trigger member 28 may be depressed to simultaneously open the valve means associated with each component feed system to feed each liquid component through outlet ports 43 and 44, into mixing chamber 112, and to thereafter be dispensed through nozzle tip 108.

As an example, in a polyurethane foam system, one liquid component may comprise an organic isocyanate such as the well known MDI, TODI, or other aromatic, naphthanic, or aliphatic diisocyanates, and a polyol such as ethylene, propylene, tetramethylene other glycols or polyesters such as polyethylenepropylene adipates as an example. The ratio of each of these liquid components being fed to the mixing chamber for subsequent polymerization is important, and ratio of polyisocyanate to polyol can vary from about 0.8 to 1.2 or higher to yield varied product properties and characteristics. Alternatively, in a polyurethane foam system, the polyol may be reacted with an isocyanate to form a pre-polymer, and the pre-polymer may comprise one of the liquid components to be mixed with a diisocyanate, triisocyanate or other isocyanate to yield the final product. Although the multi-component dispensing apparatus of the invention is particularly useful with a polyurethane foam system as described, the apparatus can be used with any system in which plural components are to be mixed and dispensed, and is particularly useful where the plural components are reactive with one another, and it is desired to maintain each of the components separate from one another until mixing and dispensing is desired.

Figure 12:
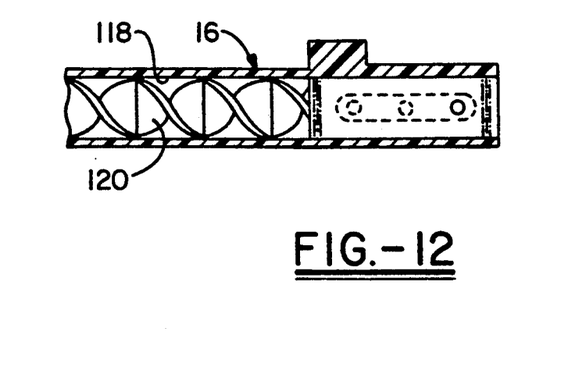
FIG. 12 is a partial cross-sectional view of a static mixing chamber which may be positioned downstream of a kinetic mixing chamber within the dispensing nozzle.

Turning to FIG. 12, an alternate embodiment of the mixing and dispensing nozzle 16 of the invention is shown. In this embodiment, a second stage of mixing is provided within nozzle 16 to ensure proper and thorough mixing of the plural components with one another. To accomplish a second stage mixing procedure, a static mixer 120 may be provided within the internal cavity 118 of nozzle 16 at a position downstream from mixing chamber insert 100, and preferably directly adjacent to the outlet opening of mixing chamber 112. In this way, material flowing from mixing chamber 112 will be directed immediately into the static mixer 120 which may provide a helical path through which the material will be forced for continued mixing thereof. It should be evident that the static mixer 120 could comprise various other configurations to accomplish additional mixing of the plural components within dispensing nozzle 16.

Figure 13:
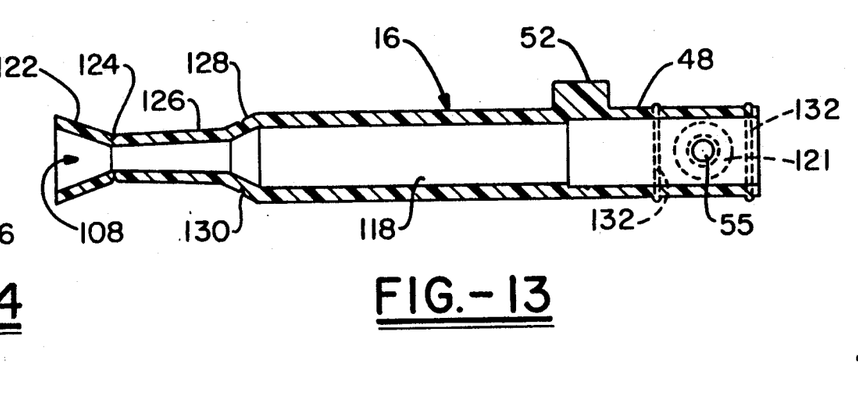
FIG. 13 is an enlarged cross-sectional view of an alternate embodiment of the mixing and dispensing nozzle of the invention showing the orifice seal and adjustable nozzle tip associated therewith.
Figure 14:
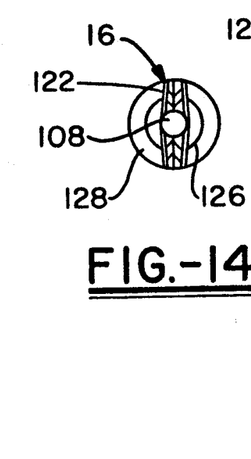
FIG. 14 is a side view of the discharge opening of the nozzle as seen in FIG. 13.

Turning now to FIGS. 13 and 14, another alternative embodiment of the dispensing nozzle 16 is shown, wherein similar elements have been indicated by similar reference numerals therein. In this embodiment of the dispensing nozzle assembly 16, the injection ports 55 and 56 provided on shank portion 48 may have an integrally formed sealing land 121 formed there around. The sealing land 121 cooperates with the interior of the nozzle opening 46 formed in mixing head 12 of the dispensing apparatus, such that injection ports 55 and 56 will be completely sealed in communication with outlet ports 43 and 44 provided within nozzle opening 46. The sealing lands 121 may cooperate with similar sealing lands provided in association with outlet ports 43 and 44, or may simply seat on the interior of the nozzle opening 46 as desired. Additionally, there may be provided integrally formed O-ring seals 132 on the outer periphery of the shank portion 48 located on each side of the injection ports 55 and 56 to further seal these locations as desired. In any event, the sealing of the injection ports 55 and 56 and outlet ports 43 and 44 is desired to prevent leakage of any liquid components within the apparatus which could cause various problems. The dispensing nozzle 16 is also provided with a nozzle tip 108 having integrally formed therein a variety of nozzle tip configurations which allow the user to select a desired nozzle tip for a particular application. The nozzle tip 108 may be provided with a flattened, fan-shaped tip 122 which will produce a relatively flat spreading sheet spray pattern exiting nozzle 16. The fan-shaped nozzle tip 122 may be desirable for various spray insulation filling, packaging or other applications to more effectively distribute the dispensed product. Alternatively, the nozzle tip 122 may be simply cut off the end of the nozzle at the location of a groove 124 integrally formed about the periphery of the nozzle tip wherein a different nozzle tip configuration 126 will be exposed. The nozzle tip 126 may be provided as a small opening especially suitable for use in potting operations or to allow use of an attached hose coupled to the nozzle tip to allow easier access to a mold.

Yet another nozzle tip 128 may be exposed by cutting a long groove 130 formed in the nozzle to yield a larger exit from the nozzle tip for increased flow of the mixed product from the nozzle. In summary, the fan-shaped tip 122 is used for spraying broad flat surfaces. Cutting off at groove 124 gives a smaller opening configuration 126 which finds use on a surface ¼ to 1/5 the size of the broad flat surface. Cutting off at groove 130 creates a large nozzle opening 128 which effectively acts as a pour nozzle with a minimum of spray and may be used for filling a void in a cavity as an example.

Alternative tip configurations may be provided if desired, and may be integrally formed in the nozzle assembly as described, to give the user more flexibility and tailor the dispensing apparatus to the particular application for which it is being used. The exterior of the nozzle 16 may be provided with a series of hose engaging raised portions conventionally used to couple a nozzle to a hose.

Figure 15:
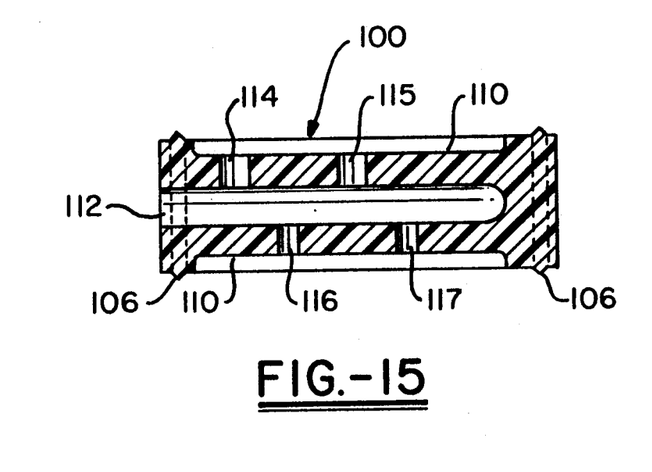
FIG. 15 shows an enlarged cross-section of an alternate embodiment of a kinetic mixing chamber associated with the dispensing nozzle and is showing different size injection ports to facilitate metering of components within the system.

Turning now to FIG. 15, an alternate embodiment of the mixing chamber insert associated with the dispensing nozzle assembly 16 is shown. In this embodiment, metering of the various individual liquid components to the mixing chamber may be varied for each of the liquid components by varying the size of injection ports 114, 115 as compared to injection ports 116 and 117 as an example. By changing the diameter of these injection ports, the ratio of a liquid component relative to another liquid component may be more effectively controlled to improve the quality of the product produced and to achieve the desired characteristics of the product. As the mixing chamber inserts 100 may be easily produced by molding techniques, and are replaceable within the dispensing nozzle 16, a user may select the appropriate mixing chamber insert for a particular application as desired. Alternatively, to provide desired metering of the individual components, a different number of injection ports may be provided in each injection channel 110 formed in the mixing chamber insert. For example, three inlet ports may be provided for one component, which only two are provided for the other component.

Although the invention has been described with reference to preferred embodiments thereof, it should be apparent that various modifications and changes in the details, materials and arrangement of parts, may occur to one skilled in the art. Thus, the foregoing description is illustrative only, and is not intended to limit the true spirit and scope of the present invention as defined in the appended claims.

What is claimed is:

1. A mixing and dispensing apparatus comprising:
   a body member with a at least one handle portion and a mixing head, said mixing head having at least one component feed system for supplying at least one component to be mixed, said component feed system having internal passages and at least one outlet port associated with said at least one feed system, with said at least one feed system having associated therewith a valve means being selectively actuated to allow flow of a said component through said internal passages,
   means to connect a at least one component supply under pressure to said at least one component feed system,
   an actuating means which is associated with said mixing head being operable to selectively act on said valve means to allow flow through said at least one component feed system,
   said mixing head including an opening, wherein said at least one outlet port of said at least one feed system is connected to said opening, and a plug means is positioned and is slidable within said opening from a first to a second position, and including means to cause said plug means to slide from said first position to said second position, wherein said at least one outlet port will be sealed by said plug means at said second position, and
   a removable dispensing nozzle positioned within said opening of said mixing head, having a hollow interior and at least one inlet port communicating with said hollow interior corresponding to said at least one outlet port connected to said opening, wherein said component will be selectively directed through said at least one component feed system, to said at least one outlet port and through said inlet port into said nozzle for dispensing thereof.

2. The apparatus of claim 1, wherein,
   said valve means is positioned within a valve cavity formed in said mixing head and comprise a spring biased valve including a sealing member coupled to a valve stem extending from said valve cavity and being operated on by said actuating means, wherein said actuating means is selectively operable to force said valve stem outwardly from said valve cavity against the retaining force of said bias spring to open said valve means and allow flow of said component through said internal passages.

3. The apparatus of claim 2, wherein said valve means comprises a needle valve positioned between a supply port coupled to said component supply and said internal passage connected to said outlet port, wherein movement of said needle valve will provide a scraping action at the location of said supply port, to maintain said supply port free from blockage.

4. The apparatus of claim 1, wherein said mixing head has a plurality of said component feed systems for mixing and dispensing plural components, wherein each of said plural components is maintained separate until the components are fed through said outlet ports and mixed within said dispensing nozzle, and wherein each of said component feed systems will meter the proper amount of said component to be mixed and dispensed using the apparatus.

5. The apparatus of claim 1, wherein,
said at least one component feed system includes metering ports through which said component is fed before being mixed within said dispensing nozzle.

6. The apparatus of claim 1, wherein,
said plug means within said opening provides a scraping action at the location of said outlet ports upon slidable movement from said first to said second position within said opening, and seals said outlet ports from the ingress of the outside atmosphere when in said second position.

7. The apparatus of claim 1, wherein,
said plug means is adapted to act on a portion of said dispensing nozzle positioned within said opening such that upon movement of said plug means from said first to said second positions, said dispensing nozzle will be ejected from said opening.

8. The apparatus of claim 1, wherein,
said actuation means is a trigger which is pivotally positioned within a trigger cavity formed in said mixing head, and said valve means includes an actuation member which is positioned adjacent said mixing head such that an upper hammer portion of said trigger may be pivoted outwardly from said trigger cavity to act on said actuation member, and is also pivotal inwardly such that said upper hammer portion travels in a portion of said opening and acts on said plug means therein.

9. The apparatus of claim 1, wherein,
said dispensing nozzle includes at least one mixing chamber formed therein which communicates with said at least one inlet port, wherein said dispensing nozzle is insertable within said opening formed in said mixing head such that said inlet port communicates with said outlet port of said component feed system for injection of said at least one component into said mixing chamber.

10. The apparatus of claim 9, wherein,
said mixing chamber is formed as an insert which is positioned within said dispensing nozzle at the location of said at least one inlet port, and has at least one injection port communicating with said inlet port of said dispensing nozzle.

11. The apparatus as in claim 10, wherein,
said mixing chamber insert includes an injection channel which is in communication with said inlet port of said dispensing nozzle, and further includes a plurality of injection ports communicating with said mixing chamber such that said component fed into said injection channel will be distributed therein and fed through each of said plurality of injection ports and into said mixing chamber.

12. The apparatus as in claim 10, wherein,
said dispensing nozzle includes a plurality of said inlet ports, each adapted to communicate with a plurality of said outlet ports, and said mixing chamber insert has a plurality of injection channels formed therein which communicate with one of said inlet ports of said dispensing nozzle, each of said injection channels further including a plurality of injection ports connecting said channels to said mixing chamber such that said component material fed to said injection channel will be directed through said plurality of injection ports into said mixing chamber.

13. The apparatus as in claim 12, wherein,
said plurality of injection channels are positioned in opposed relation to one another on said mixing chamber insert, and said plurality of injection ports are axially offset from opposing injection ports such that material fed into said mixing chamber through said inlet ports formed in each of said channels will be directed against an opposing wall of said mixing chamber for impingement mixing of the component materials.

14. The apparatus of claim 1, wherein,
said dispensing nozzle includes at least one inlet port communicating with said at least one outlet port such that component material will be supplied to said dispensing nozzle through said inlet port, said at least one inlet port being connected to a kinetic mixing chamber within said nozzle wherein a first stage of mixing will occur and said nozzle including a static mixing means wherein a second stage of mixing will occur within said nozzle before the mixed material is dispensed therefrom.

15. The apparatus of claim 1, wherein,
said dispensing nozzle includes at least one inlet port adapted to communicate with said at least one outlet port, wherein said at least one inlet port includes integrally formed sealing means which seal each of these ports during operation of said apparatus.

16. The apparatus of claim 1, wherein said mixing head includes means to prevent mixing of said plural components other than within said dispensing nozzle.

17. The apparatus of claim 1, wherein,
said dispensing nozzle includes at least one inlet port adapted to communicate with said at least one outlet port, wherein said at least one outlet port includes integrally formed sealing means which seal each of these ports during operation of said apparatus.

18. The apparatus as in claim 1, wherein,
said dispensing nozzle includes a plurality of inlet ports, each communicating with an injection channel which communicates with said hollow interior, said injection channels having a plurality of injection ports, and said plurality of injection ports formed in each of said channels are positioned in opposing relationship and are axially offset such that material fed into said mixing chamber will be directed against an opposing wall of said mixing chamber for impingement mixing of the component materials.

19. A plural component mixing and dispensing apparatus comprising:
a body member with a mixing head, said mixing head having at least two component feed systems, each for a component to be mixed and dispensed, said component feed systems including an outlet port and a valve means disposed to selectively allow flow of a said component to said outlet port,
means to connect a plurality of component supplies under pressure to said component feed systems,
actuation means operable to selectively act on said valve means to allow flow of material through each said component feed system, said mixing head including an opening with which said outlet ports of said feed systems communicate, and a dispensing nozzle positioned within said opening and having at least one inlet port corresponding to said outlet ports of said component feed systems, said nozzle including a mixing chamber having a plurality of injection channels formed therein which communicate with said at least one inlet port, said injection channels having a plurality of injection ports communicating with said mixing chamber, wherein each of said plural components will be selectively fed through said component feed systems, and to said nozzle for mixing and dispensing thereof.

20. The apparatus of claim 19, wherein said valve means comprises a needle valve having a sealing member positioned between a supply port and an internal passage connected to said outlet port, wherein movement of said sealing member needle valve will provide a scraping action at the location of said inlet port, to maintain said inlet port free from blockage.

21. The apparatus of claim 19, wherein said mixing head includes means to prevent mixing of said plural components other than within said dispensing nozzle.

22. The apparatus as in claim 19, wherein,
said plurality of injection channels are positioned in opposed relation to one another, and said plurality of injection ports formed in each of said channels are axially offset from opposing injection ports such that material fed into said mixing chamber through said injection ports formed in each of said channels will be directed against an opposing wall of said mixing chamber for impingement mixing of the component materials.

23. A replacement mixing and dispensing nozzle for a dispensing system comprising:
a body portion having first and second ends, said first end adapted to operatively fit into a nozzle receiving means of a plural component dispensing apparatus, and a nozzle tip formed at said second end adapted to discharge a material to be dispensed;
a mixing chamber positioned adjacent said first end and having a plurality of inlet ports, each adapted to be coupled to a source of a material, wherein said plurality of inlet ports communicate with said mixing chamber and said plurality of inlet ports are positioned in opposed relation about said mixing chamber, and are offset with respect to one another such that material entering said mixing chamber through said inlet ports will be directed against an opposing wall of said mixing chamber for impingement mixing of said material.

24. The replaceable nozzle assembly of claim 23, wherein,
said mixing chamber is formed as an insert positioned within said first end of said nozzle and includes a plurality of injection channels communicating with said inlet ports, each of said injection channels having a plurality of openings injection communicating with said mixing chamber.

25. The replaceable nozzle assembly of claim 23, wherein,
each of said inlet ports includes an integrally formed sealing means positioned therearound, such that said sealing means will prevent leakage of a said material around said inlet port when coupled to a source of said material under pressure.

26. The replaceable nozzle assembly of claim 23, further comprising;
a static mixing means positioned within said nozzle at a point downstream of said mixing chamber, such that material exiting said mixing chamber will flow through said static mixing means before being dispensed from said second end.

27. The replaceable nozzle assembly of claim 23, wherein,
said second end of said nozzle includes a plurality of nozzle tips integrally formed therein, wherein each of said plurality of nozzle tips may be selectively exposed for use.

28. A mixing and dispensing apparatus comprising:
a mixing head having at least one component feed system for supplying a component to be mixed and dispensed, said at least one component feed system including at least one outlet port, said mixing head including an opening with said at least one outlet port communicating with said opening, and including a plug means movably positioned within said opening, and means to move said plug means from a first to a second position within said opening,
a removable dispensing nozzle positioned within said opening and having at least one inlet port which is selectively positioned to communicate with said at least one outlet port in said opening of said mixing head, wherein when said plug means is positioned in said first position, the at least one inlet port of said dispensing nozzle can be positioned to communicate with said at least one outlet port, and wherein upon operation of said means to move said plug means within said opening to said second position, said at least one outlet port of said at least one component feed system will be sealed by said plug means to render the dispensing apparatus nonoperational.

29. A replacement mixing and dispensing nozzle for a dispensing system comprising:
a body portion having first and second ends, said first end adapted to operatively fit into a nozzle receiving means of a dispensing apparatus, and a nozzle tip formed at said second end adapted to discharge a material to be dispensed;
a mixing chamber positioned adjacent said first end and having at least one inlet port adapted to be coupled to a source of a material to be dispensed, at least one injection channel communicating with said at least one inlet port and having a plurality of injection ports communicating with said mixing chamber wherein material entering said mixing chamber through said injection ports will be directed against an opposing wall of said mixing chamber for impingement mixing of said material.

30. A method of mixing and dispensing materials comprising the steps of:
providing a dispensing apparatus having at least one feed system including at least one outlet port communicating with a nozzle opening in said dispensing apparatus,
positioning a plug means in said nozzle opening which is movable between at least first and second positions within said nozzle opening,
positioning a dispensing nozzle within said nozzle opening, said dispensing nozzle having at least one inlet port therein, such that upon positioning of said nozzle in said nozzle opening, said at least one inlet port will communicate with said at least one outlet port and said plug means will be in said first position, supplying at least one material to be mixed and dispensed to said at least one feed system such that material supplied through said at least one feed system will flow into said nozzle for mixing and dispensing thereof, ejecting said dispensing nozzle from said nozzle opening by moving said plug means to said second position, whereby said at least one feed system will be sealed by said plug means to prevent flow of material through said at least one outlet port when no dispensing nozzle is positioned within said nozzle opening and to prevent the ingress of the outside atmosphere to said at least one feed system.

* * * * *